(12) United States Patent
Surti

(10) Patent No.: US 8,146,949 B2
(45) Date of Patent: Apr. 3, 2012

(54) MUD FLAP

(76) Inventor: Tarun Natwarlal Surti, Nashville, TN (US)

( * ) Notice: Subject to any disclaimer, the term of this patent is extended or adjusted under 35 U.S.C. 154(b) by 270 days.

(21) Appl. No.: 12/552,926

(22) Filed: Sep. 2, 2009

(65) Prior Publication Data

US 2011/0049858 A1  Mar. 3, 2011

(51) Int. Cl.
*B62D 25/18* (2006.01)
(52) U.S. Cl. .......................... 280/851; 280/847
(58) Field of Classification Search ............... 280/847, 280/848, 851
See application file for complete search history.

(56) References Cited

U.S. PATENT DOCUMENTS

| | | | | |
|---|---|---|---|---|
| 4,382,606 A | * | 5/1983 | Lightle et al. | 280/851 |
| 5,022,680 A | * | 6/1991 | Eklund, Jr. | 280/851 |
| 5,273,318 A | * | 12/1993 | Nakayama et al. | 280/851 |
| 5,564,750 A | | 10/1996 | Bajorek et al. | |
| 6,851,717 B1 | | 2/2005 | Andersen | |
| 7,625,013 B2 | * | 12/2009 | Kellick | 280/851 |
| 2007/0278781 A1 | | 12/2007 | Downes | |

FOREIGN PATENT DOCUMENTS

GB  2229689 A  10/1990

\* cited by examiner

*Primary Examiner* — John Walters
(74) *Attorney, Agent, or Firm* — Edward S. Wright

(57) ABSTRACT

Mud flap having a plurality of laterally spaced, vertically extending vanes defining a plurality of vertically extending channels on the front side of the flap for directing water and debris from a wheel in a downward direction toward the roadway and not to the rear or sides of the flap, and vertically extending slotted openings in the channels of a size permitting air to pass through the openings to the rear of the flap and preventing water and debris from doing so. In some embodiments, vertically extending deflectors are positioned to the rear of the slotted openings for directing any water and debris passing through the openings in a downward direction toward the roadway.

17 Claims, 5 Drawing Sheets

Fig. 8
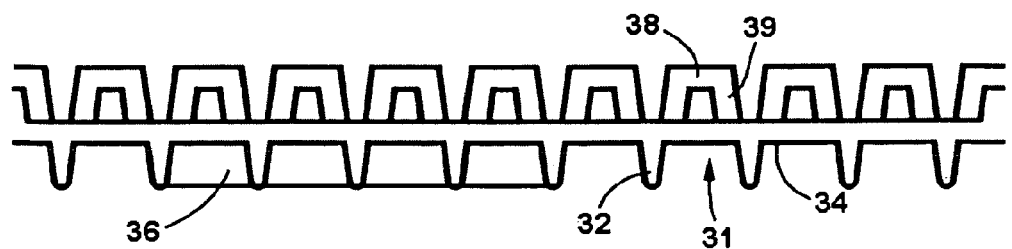
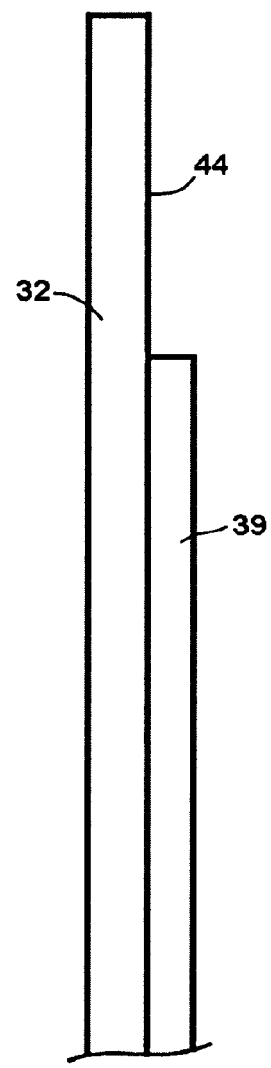
Fig. 9

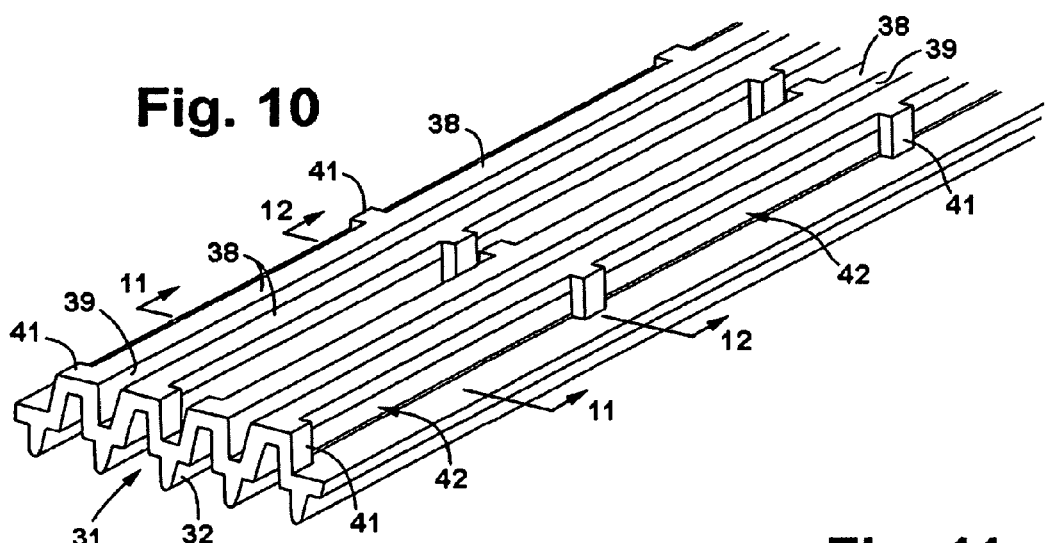
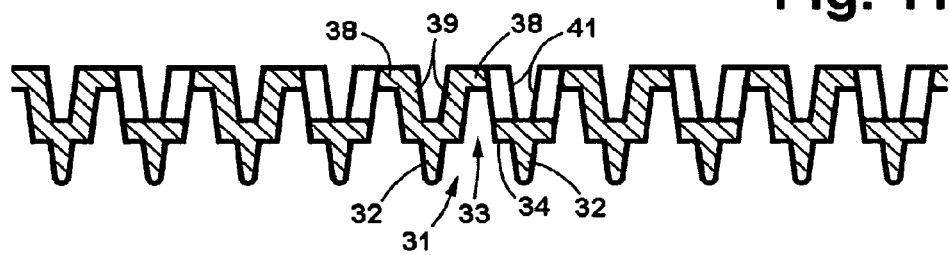
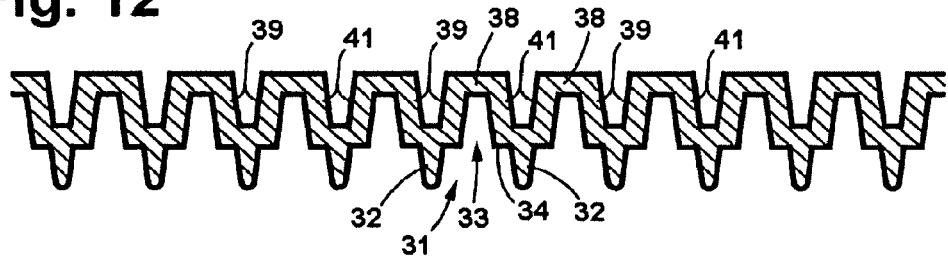
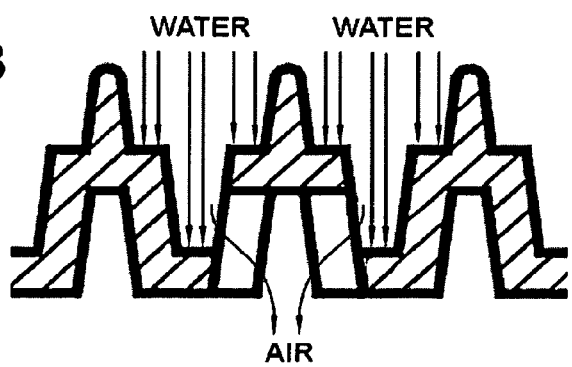

MUD FLAP

BACKGROUND OF THE INVENTION

1. Field of Invention

This invention pertains generally to motor vehicles and, more particularly, to a mud flap for preventing spray from the wheel of a vehicle on a wet roadway from impairing the vision of drivers of other vehicles.

2. Related Art

Mud flaps are commonly employed on trucks and other large vehicles to block the spray of water, mud, and other debris from wheels on a wet roadway and prevent that spray from impairing the vision of the drivers of other vehicles. Such flaps are typically in the form of relatively large, rectangular rubber panels which are hung vertically behind the wheels to block the spray. The effectiveness of such flaps is diminished when air flow causes them to swing back in an upward direction away from the wheels, and the weight and wind resistance of the flaps can also reduce the operating efficiency of the vehicle.

Heretofore, there have been some attempts to avoid the disadvantages of solid rubber mud flaps by providing mud flaps which are lighter in weight and allow air to flow through them. However, those flaps can still deflect water, mud, and other debris off to the side and into the paths of other vehicles.

OBJECTS AND SUMMARY OF THE INVENTION

It is, in general, an object of the invention to provide a new and improved mud flap for preventing spray from the wheel of a vehicle on a wet roadway from impairing the vision of drivers of other vehicles.

Another object of the invention is to provide a mud flap of the above character which overcomes the limitations and disadvantages of mud flaps heretofore provided.

These and other objects are achieved in accordance with the invention by providing a mud flap having a plurality of laterally spaced, vertically extending vanes defining a plurality of vertically extending channels on the front side of the flap for directing water and debris from a wheel in a downward direction toward the roadway and not to the rear or sides of the flap, and vertically extending slotted openings in the channels of a size permitting air to pass through the openings to the rear of the flap and preventing water and debris from doing so. In some embodiments, vertically extending deflectors are positioned to the rear of the slotted openings for directing any water and debris passing through the openings in a downward direction toward the roadway.

BRIEF DESCRIPTION OF THE DRAWINGS

FIG. 8 is an enlarged, fragmentary top plan view of the embodiment of FIG. 7.

FIG. 9 is an enlarged, fragmentary side elevational view of the embodiment of FIG. 7.

FIG. 10 is an enlarged, fragmentary lower rear isometric view of the embodiment of FIG. 7.

FIGS. 11 and 12 are enlarged, fragmentary horizontal sectional views taken along lines 11-11 and 12-12 in FIG. 10.

FIG. 13 is a splash diagram illustrating the flow of water and air in the embodiment of FIG. 7.

DETAILED DESCRIPTION

Figure 1:
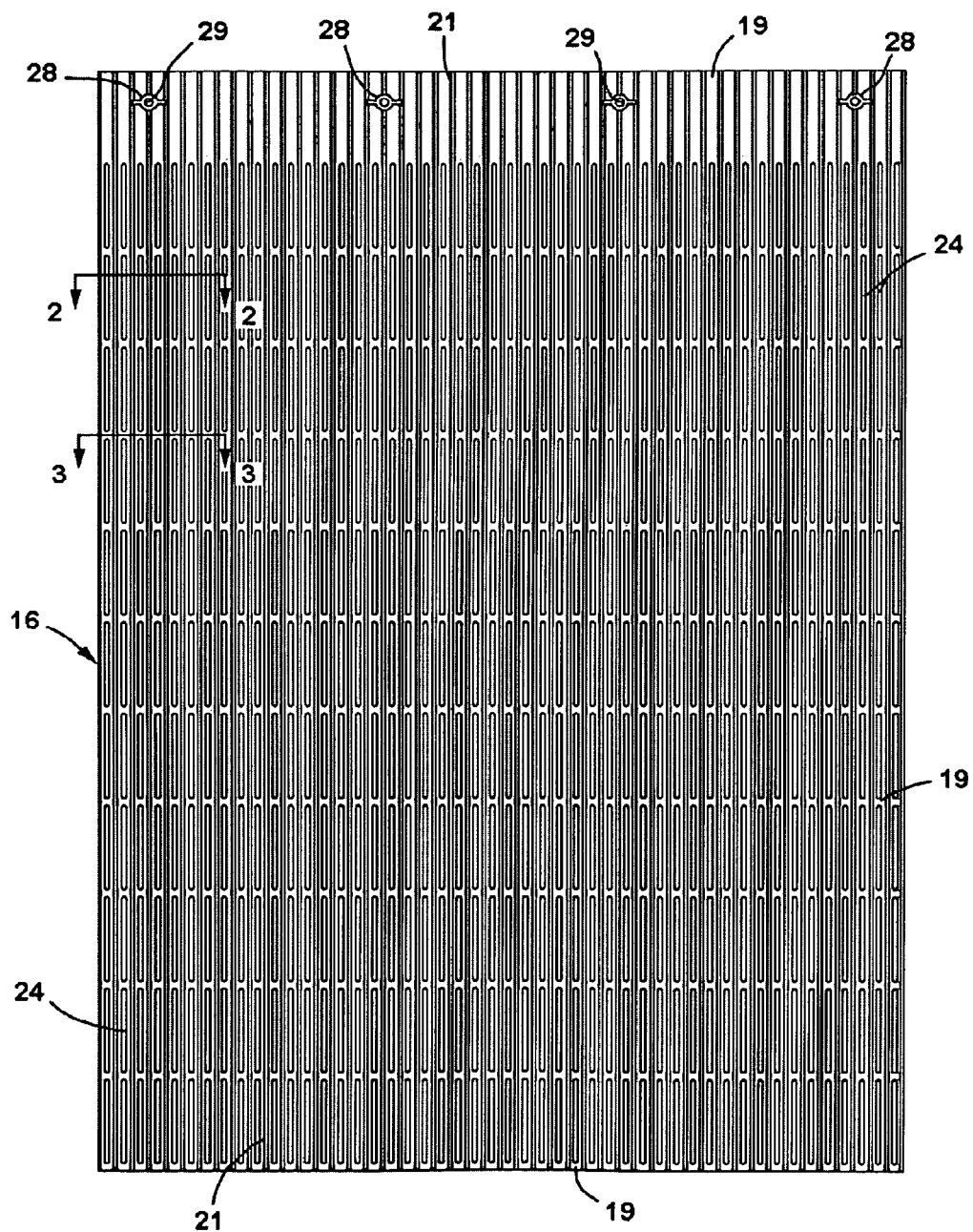
FIG. 1 is a front elevational view of one embodiment of a mud flap according to the invention.
Figure 2:
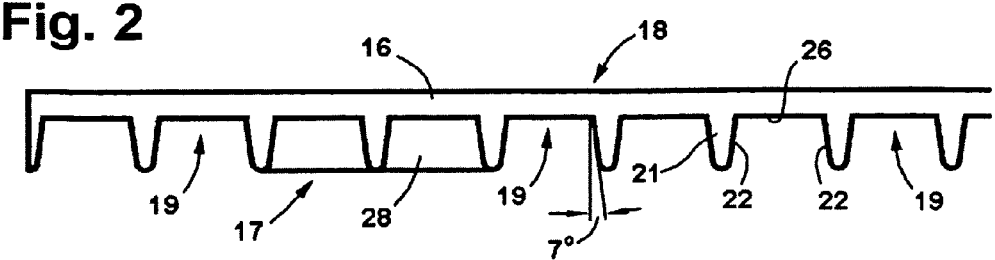
FIG. 2 is an enlarged, fragmentary top plan view of the embodiment of FIG. 1.
Figure 3:
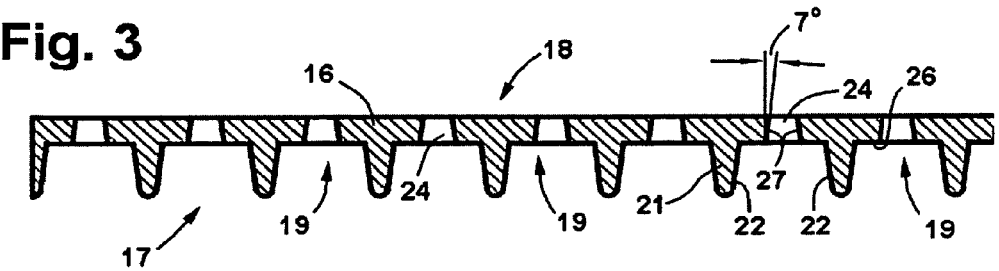
FIGS. 3 and 4 are enlarged, fragmentary cross-sectional views taken along lines 3-3 and 4-4 in FIG. 1.
Figure 4:
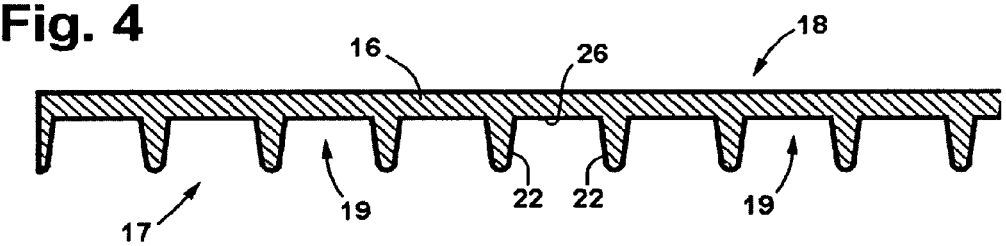

As illustrated in FIGS. 1-4, the mud flap comprises a generally rectangular panel 16 having a front side 17 which faces the wheel and a rear side 18 which faces away from the wheel when the mud flap is installed on a vehicle. Throughout this disclosure and claims, the term "wheel" is used generically as including both the tire which engages the roadway or ground and the rim or wheel on which the tire is mounted.

A plurality of vertically extending channels 19 are formed between laterally spaced vanes 21 on the front side of the panel for carrying water, mud and other debris in a downward direction and preventing it from being thrown into the path of other vehicles. The vanes are tapered, with the lateral surfaces 22 of the vanes on opposite sides of each of the channels being inwardly and rearwardly inclined relative to each other to direct air, water and debris into the channels. The front edges, or noses, of the vanes are rounded. In one presently preferred embodiment, the surfaces are inclined at an angle on the order of 7 degrees to a plane perpendicular to the panel, with the surfaces at the sides of each channel intercepting an angle on the order of 14 degrees toward the rear of the panel. The vanes are spaced apart by a center-to-center distance on the order of 0.5 inch and extend on the order of 0.25 inch from the front side of the panel. However, it will be understood vanes can have any degree of taper and height that will funnel the air, water, and debris into the channels and prevent it from being thrown off to the sides of the flap.

Slotted openings 24 in the rear walls 26 of the channels permit air to flow through the mud flap. These openings are disposed end-to-end in vertically extending rows, and each of the openings has a pair of inwardly and rearwardly inclined side walls 27 which are spaced apart by a distance that permits air to pass through the opening while preventing water and debris from doing so. In embodiment illustrated, side walls 27 are inclined at same angles as the side walls 22 of the channels (e.g., 7 degrees) and are spaced apart by a distance on the order of 0.156 inch at the front of the openings and 0.125 inch at the rear. The openings are on the order of 2.75 inches in length and are spaced apart by a distance on the order of 0.25 inch.

Mounting pads 28 are provided near the upper end of the panel, with holes 29 in the pads for receiving bolts (not shown) used in attaching the mud flap to a vehicle.

The mud flap is fabricated as a unitary structure by a suitable process such as injection molding. It is formed of a high density polyethylene material that can withstand road abuse and extreme weather conditions and is also lighter than rubber.

Figure 5:
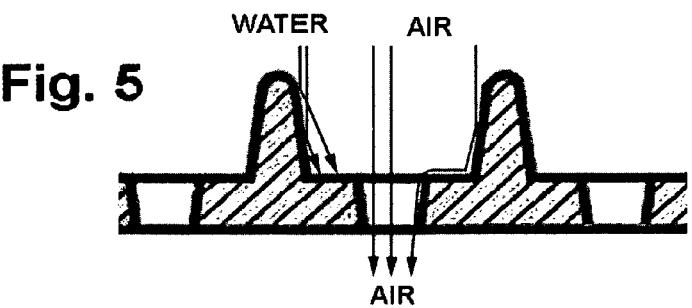
FIG. 5 is a splash diagram illustrating the flow of water and air in the embodiment of FIG. 1.

In use, the mud flap is mounted in a vertical position to the rear of a wheel, with channels 19 and vanes 21 facing the wheel. Water and debris thrown up from the road by the wheel impact upon the side walls 22 and rear walls 26 of the channels, as illustrated in FIG. 5. Water and air striking the inwardly and rearwardly inclined side walls are deflected toward the rear walls, with the angles of deflection being substantially equal to the angles of incidence, i.e. 7 degrees in the example given above.

Being heavier than air, water and debris tend to travel in straight lines, and when they strike the rear walls, they stop and then flow in a downward direction within the channels toward the ground. Instead of dropping when it hits the rear walls, the lighter air continues to travel laterally until it is blown or drawn through the slotted openings 24 in them. Because of the narrow width of the openings, relatively little water and debris can escape through them. Thus, the air and water are effectively separated in the channels, with the air flowing out through the slotted openings and the water and debris flowing down through the channels to the ground where it will not form spray clouds or impair the vision of the drivers of other vehicles.

The protruding vanes prevent water and debris from being deflected to the sides of the mud flap, while their inclined side surfaces effectively funnel the water and air into the channels and keep it there. Moreover, since the inclination of the side walls is only a few degrees from the path of the water and air striking the flap, splashing is significantly reduced.

Figure 6:
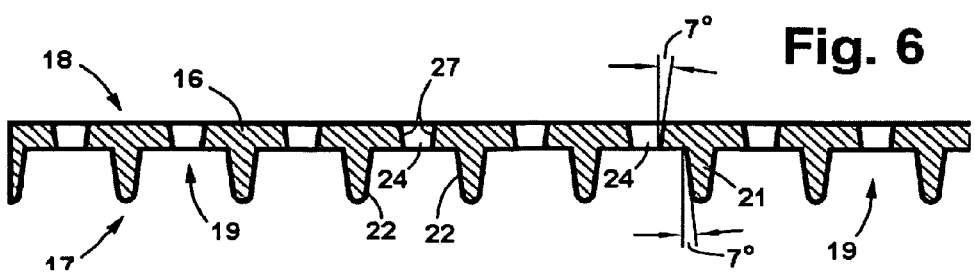
FIG. 6 is an enlarged, fragmentary horizontal sectional view, similar to FIG. 3, of another embodiment of a mud flap according to the invention.
Figure 7:
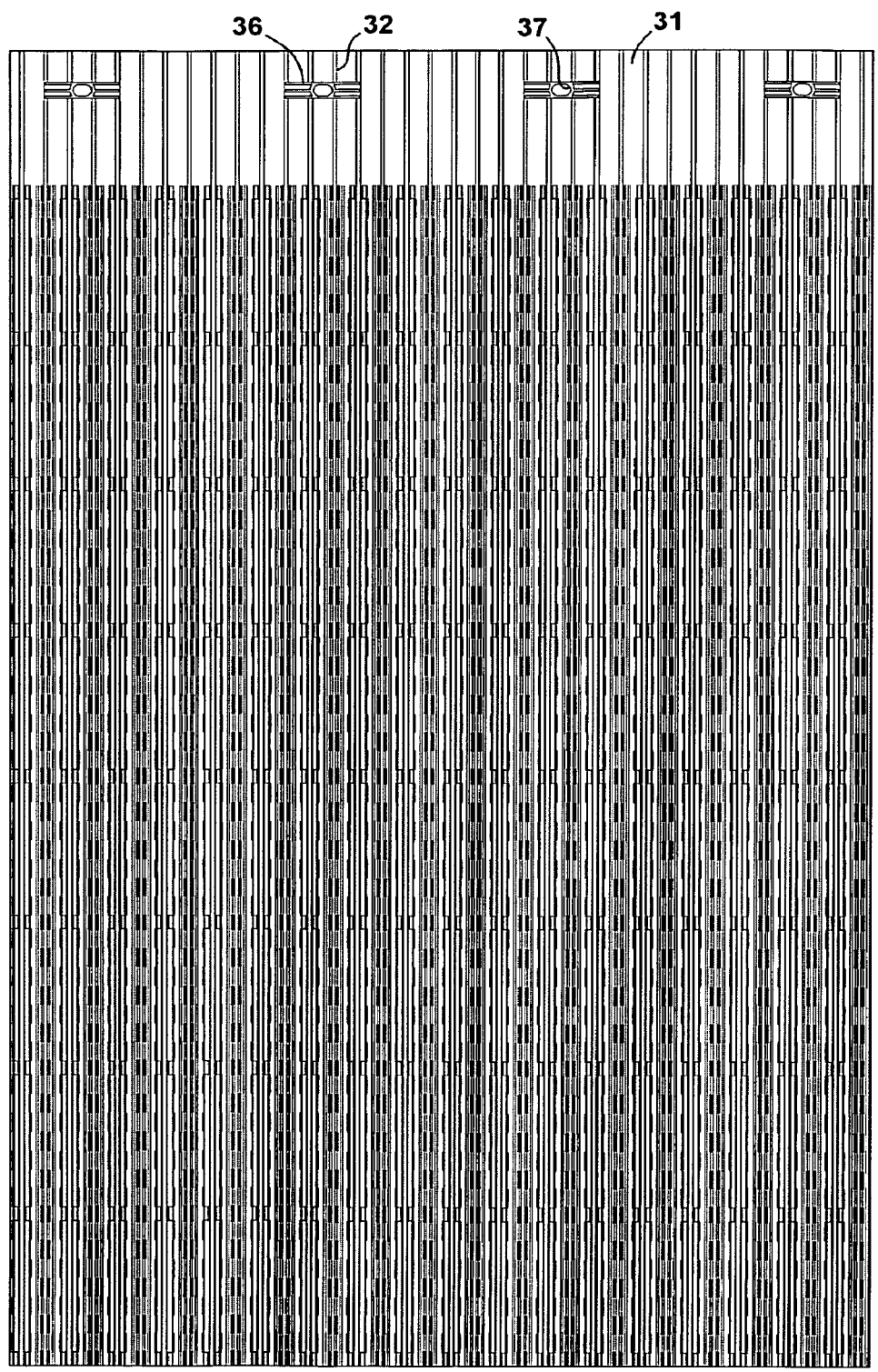
FIG. 7 is a front elevational view of another embodiment of a mud flap according to the invention.

The embodiment of FIG. 6 is similar to the embodiment of FIGS. 1-4, the only difference being the inclination of the side walls of the slotted openings. In this embodiment, rather than being inclined inwardly toward the rear of the openings, side walls 27 diverge toward the rear, with the openings being wider at the rear than at the front. With this orientation of the side walls, water and debris entering the slots is more easily dislodged due to the larger opening in the rear.

The embodiment of FIGS. 7-12 is similar to the embodiment of FIGS. 1-4 in that it has a plurality of vertically extending channels 31 between laterally spaced vanes 32 on the front side of the flap, with slotted openings 33 in the rear walls 34 of the channels. The vanes and openings are similar to the vanes 21 and slotted openings 24 in the first embodiment, with the lateral surfaces at the sides of the channels and the side walls of the openings being inwardly and rearwardly inclined at similar angles. In this embodiment, however, the slotted openings extend substantially the full length of the channels rather than having a series of shorter openings in each channel. Mounting pads 36 with elongated openings 37 are provided toward the upper end of the flap.

Vertically extending deflectors 38 are positioned to the rear of slotted openings 33 for directing any water and debris passing through the openings in a downward direction toward the ground. The deflectors are supported on one side by side walls 39 which extend from the rear walls of the channels at the same angles as the side walls of the slotted openings. Side walls 39 are coplanar with the side walls of the slotted openings, and together they form a continuous inwardly and rearwardly inclined surface which extends between the rear wall of the channel and the one side of the deflector.

The other sides of the deflectors are supported by a plurality of bridges 41 which extend between the rear walls of the channels and the deflectors. These bridges are spaced vertically apart along the slotted openings and the deflectors, with the spaces between them being open to form air outlets 42. In the embodiment illustrated, the arrangement of the side walls and air outlets is such that side walls and outlets are on opposite sides of adjacent channels, with the air outlets for adjacent channels facing each other on the rear side of the flap.

The slotted openings and deflectors begin several inches below the upper edge of the flap, with a flat surface 44 above them on the rear side of the flap to facilitate mounting the flap on a vehicle.

As in the embodiment of FIGS. 1-4, the mud flap of FIGS. 7-12 is formed as a unitary structure of a suitable material such as a high density polyethylene material, and it is fabricated by a suitable process such as injection molding.

Operation and use of the embodiment of FIGS. 7-12 is similar to that described above in that water and debris tend to strike the walls of the channels and be directed in a downward direction, whereas air tends to find its way out through the slotted openings. In this embodiment, however, any water and or debris that does pass through the slotted openings will tend to strike side walls 39 and deflectors 38 and be directed in a downward direction toward the ground. At the same time, side walls 39 and deflectors 38 will direct air through outlets 42 to the rear of the flap.

The invention has a number of important features and advantages. It separates air, water and road debris thrown up by a tire or wheel and directs the water and debris to the ground while allowing the air to pass through the air outlets. It is 50% lighter than a rubber flap, keeps the tire cooler, and improves fuel efficiency of the vehicle while reducing vision blurring clouds on wet roads. It is also stronger than a rubber flap and can take more road abuse, and it is made of a material that can handle extreme weather conditions. The vanes stiffen the flap and minimize the curl-up to enhance the downward flow of the water and debris. Moreover, with the unique structural design of the flap, the continuous agitation provided by the warm mixture of air and water from the rotating tire dislodges any debris attached to the flap.

It is apparent from the foregoing that a new and improved mud flap has been provided. While only certain presently preferred embodiments have been described in detail, as will be apparent to those familiar with the art, certain changes and modifications can be made without departing from the scope of the invention as defined by the following claims.

The invention claimed is:

1. A mudflap for preventing spray from a wheel of a vehicle on a wet roadway from impairing the vision of drivers of other vehicles, comprising a vertically extending flap which is mounted to the rear of the wheel with a front side of the flap facing the wheel and a rear side facing away from the wheel, a plurality of laterally spaced, vertically extending vanes defining a plurality of vertically extending channels on the front side of the flap for directing water and debris from the wheel in a downward direction toward the ground and not to the rear or sides of the flap, and vertically extending slotted openings in the channels of a size permitting air to pass through the openings to the rear of the flap and preventing water and debris from doing so.

2. The mudflap of claim 1 wherein the vanes are tapered with lateral surfaces of the vanes on opposite sides of the channels being inwardly and rearwardly inclined to direct water and debris into the channels.

3. The mudflap of claim 1 wherein each of the slotted openings has a pair of rearwardly and inwardly inclined side walls.

4. The mudflap of claim 1 wherein each of the slotted openings has a pair of rearwardly and outwardly inclined side walls.

5. The mudflap of claim 1 wherein the slotted openings are arranged end-to-end in vertically extending rows in the channels between the vanes.

6. The mudflap of claim 1 including vertically extending deflectors positioned to the rear of the slotted openings for directing any water and debris passing through the openings in a downward direction toward the ground.

7. The mudflap of claim 6 including a side wall between one side of each of the slotted openings and a corresponding one of the deflectors, with air outlets between the other sides of the slotted openings and the deflectors through which air passing through the slotted openings can flow.

8. The mudflap of claim 1 including mounting pads in an upper portion of the flap for use in attaching the mud flap to the vehicle.

9. A mudflap for preventing spray from a wheel of a vehicle on a wet roadway from impairing the vision of drivers of other vehicles, comprising a vertically extending flap, a plurality of laterally spaced, vertically extending, tapered vanes with inwardly and rearwardly inclined lateral surfaces that define a plurality of vertically extending channels for carrying water and debris striking the front side of the flap in a downward direction, and vertically extending slotted openings with inclined side walls which permit air to pass from the channels through the flap and prevent water and debris from doing so.

10. The mudflap of claim 9 wherein the lateral surfaces of the tapered vanes on opposite sides of the channels intercept angles on the order of 14 degrees toward the rear of the flap.

11. The mudflap of claim 9 wherein the side walls of the slotted openings intercept angles on the order of 14 degrees toward the rear of the flap.

12. The mudflap of claim 9 wherein the side walls of the slotted openings intercept angles on the order of 14 degrees toward the front of the flap.

13. The mudflap of claim 9 wherein the slotted openings are arranged end-to-end in vertically extending rows in the channels between the vanes.

14. A mud flap for a vehicle, comprising vertically extending vanes spaced laterally apart on the front side of the mud flap, vertically extending channels between adjacent ones of the vanes for carrying water and debris in a downward direction with the vanes preventing the water and debris from being deflected in a lateral direction, vertically extending slotted openings in rear walls of the channels of a size permitting air to pass through the mud flap and preventing water and debris from doing so, deflectors aligned with the slotted openings on the rear side of the mud flap, a side wall extending between one side of each of the slotted openings and a corresponding one of the deflectors for directing any water and debris passing through the slotted opening in a downward direction, and air outlets between the other sides of the slotted openings and the deflectors through which air passing through the slotted openings can flow.

15. The mud flap of claim 14 wherein the vanes are tapered with the lateral surfaces of each of the vanes intercepting an acute angle toward the front of the vane.

16. The mud flap of claim 14 wherein each of the slotted openings has a pair of inwardly and rearwardly inclined side walls, the side wall extending between the one side of the slotted opening and the deflector is coplanar with the side wall of the opening, and the deflectors are parallel to the rear walls of the channels.

17. The mud flap of claim 14 including a plurality of vertically spaced apart bridges interconnecting the rear wall of the channel on the opposite side of each of the slotted openings and the corresponding deflector, with the air outlets being formed between the bridges.

\* \* \* \* \*